United States Patent
Morein et al.

(10) Patent No.: US 9,500,299 B2
(45) Date of Patent: *Nov. 22, 2016

(54) THERMAL MANAGEMENT VALVE MODULE WITH ISOLATED FLOW CHAMBERS

(71) Applicant: Schaeffler Technologies AG & Co. KG, Herzogenaurach (DE)

(72) Inventors: Alexander Joseph Morein, Royal Oak, MI (US); Sebastian Hurst, Bubenreuth (DE); Daniel Constantin, Wilhermsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 130 days.

This patent is subject to a terminal disclaimer.

(21) Appl. No.: 14/336,280

(22) Filed: Jul. 21, 2014

(65) Prior Publication Data

US 2015/0027572 A1 Jan. 29, 2015

Related U.S. Application Data

(60) Provisional application No. 61/858,153, filed on Jul. 25, 2013.

(51) Int. Cl.
*F01P 7/14* (2006.01)
*F16K 11/085* (2006.01)
(Continued)

(52) U.S. Cl.
CPC ......... *F16K 41/026* (2013.01); *F16K 11/0876* (2013.01); *F01P 2007/146* (2013.01);
(Continued)

(58) Field of Classification Search
CPC ............ F16K 41/026; F16K 11/0876; F16K 11/0873; F16K 11/087; F16K 11/0853; F16K 11/10; F16K 11/085; F16K 11/0856; F01P 2007/146; F01P 7/14; Y10T 137/86566; Y10T 137/87153; Y10T 137/87161; Y10T 137/86871; Y10T 137/87249; Y10T 137/87708; Y10T 137/87032; Y10T 137/87016; Y10T 137/87024; Y10T 137/86831; Y10T 137/86549

See application file for complete search history.

(56) References Cited

U.S. PATENT DOCUMENTS 1,270,722 A * 6/1918 Gillette ............... F16K 7/06
137/595
2,399,460 A * 4/1946 Britton ............... F16K 11/22
137/555

(Continued)

FOREIGN PATENT DOCUMENTS

DE 102006055536 6/2008
FR 1503926 A * 12/1967 ......... F16K 11/0873
GB 625685 7/1949

*Primary Examiner* — Mary McManmon
*Assistant Examiner* — David Colon Morales
(74) *Attorney, Agent, or Firm* — Volpe and Koenig, P.C.

(57) ABSTRACT

A thermal management valve module having separate first and second flow chambers is provided, with one or more respective inlets and outlets connected to each of the flow chambers. A first valve body is rotatably positioned in the first flow chamber, and includes a fluid pathway that connects a first and/or third inlet to a first outlet, which allows separate or mixed flows, or blocks the flow, based on the valve body position. A second valve body is rotatably positioned in the second flow chamber, and includes a fluid pathway that connects a second and/or fourth inlet to a second outlet, which allows separate or mixed flows, or blocks the flow, based on the valve body position. At least one actuator controls the positions of the first and second valve bodies.

18 Claims, 5 Drawing Sheets

(51) Int. Cl.
*F16K 41/02* (2006.01)
*F16K 11/087* (2006.01)

(52) U.S. Cl.
CPC ..... *F16K11/0853* (2013.01); *Y10T 137/86566* (2015.04); *Y10T 137/86871* (2015.04); *Y10T 137/87153* (2015.04); *Y10T 137/87161* (2015.04)

(56) References Cited

U.S. PATENT DOCUMENTS

| | | | | |
|---|---|---|---|---|
| 3,070,974 | A * | 1/1963 | Greenwald | F16K 11/12 137/595 |
| 3,595,270 | A * | 7/1971 | McNeal, Jr. | F16K 11/202 137/575 |
| 4,276,746 | A | 7/1981 | Yamanaka et al. | |
| 4,286,624 | A * | 9/1981 | Clausen | F16K 11/207 137/255 |
| 4,312,372 | A * | 1/1982 | Amos | F02D 33/003 123/41.42 |
| 4,427,057 | A * | 1/1984 | Bouvot | B60H 1/00485 123/41.08 |
| 4,524,679 | A | 6/1985 | Lyons | |
| 4,622,997 | A * | 11/1986 | Paddington | F16L 37/373 137/595 |
| 4,655,252 | A * | 4/1987 | Krumhansl | F16K 11/0853 137/269 |
| 4,890,648 | A * | 1/1990 | Giordano | E03C 1/023 137/594 |
| 5,084,031 | A * | 1/1992 | Todd | A61B 5/02158 137/595 |
| 5,269,347 | A * | 12/1993 | Beasley | F16K 11/163 137/607 |
| 5,437,304 | A * | 8/1995 | Delcroix | B29C 33/04 137/595 |
| 5,617,815 | A * | 4/1997 | Spies | F16K 11/0853 123/41.1 |
| 5,937,903 | A * | 8/1999 | Afshar | F16K 11/0856 137/597 |
| 6,027,098 | A * | 2/2000 | Nevrekar | F16K 3/04 251/164 |
| 6,164,248 | A * | 12/2000 | Lehmann | F01P 5/10 123/41.1 |
| 6,197,195 | B1 * | 3/2001 | Booth | B01D 29/35 137/454.6 |
| 6,206,028 | B1 * | 3/2001 | Holden | F16K 5/0647 137/271 |
| 6,308,739 | B1 * | 10/2001 | Barbuto | F16K 5/0478 137/625.11 |
| 6,568,428 | B2 * | 5/2003 | Pecci | F16K 27/003 137/595 |
| 6,681,805 | B2 | 1/2004 | McLane et al. | |
| 6,886,508 | B1 * | 5/2005 | Luffy | F01M 1/18 123/198 B |
| 6,994,316 | B2 * | 2/2006 | Pervaiz | F16K 11/085 251/160 |
| 2006/0065313 | A1 * | 3/2006 | Saleri | F16K 5/0605 137/625.41 |
| 2006/0118066 | A1 * | 6/2006 | Martins | F01P 7/165 123/41.08 |
| 2007/0039653 | A1 * | 2/2007 | Maggard | F16K 11/07 137/625.19 |
| 2010/0282190 | A1 * | 11/2010 | Stoermer | F16K 11/0856 123/41.08 |

\* cited by examiner

THERMAL MANAGEMENT VALVE MODULE WITH ISOLATED FLOW CHAMBERS

INCORPORATION BY REFERENCE

The following documents are incorporated herein by reference as if fully set forth: U.S. Provisional Application No. 61/858,153, filed Jul. 25, 2013.

FIELD OF INVENTION

The present invention relates to thermal management systems used to direct coolant flows in vehicles, particularly for direction of coolant flows in connection with the engine and various other systems in motor vehicles.

BACKGROUND

In automotive applications, there is a push for energy efficiency. One way to increase efficiency of motor vehicles is to control the coolant flows to and from the internal combustion engine so that the engine operates at a peak operating temperature. It has been known to use switchable coolant pumps so that the coolant flow is switched off while the engine heats up from a cold start more quickly. Additionally, throttling of coolant flows is also known using a thermal management module; however, these known thermal management modules valves only include a single outlet temperature.

One known prior art valve used in connection with a thermal management system is disclosed in DE 10 2006 055 536. In this case, a rotary valve having two coaxial rotary valve bodies located within a housing are provided. Here the inlet is in an axial direction and, depending upon the location of the coaxial valve bodies, the coolant flow is directed to a first or second outlet that can be separately switched off and on in order to control the flow of coolant from the water pump to various heat exchangers used in connection with the engine and various other systems, such as an oil cooler. However, there is no possibility for providing different outlet temperatures from the device.

It would be desirable to provide a way for allowing coolant at different temperatures to be available to different motor vehicle systems and engine components.

SUMMARY

Briefly stated, a thermal management valve module is provided which includes a housing with an isolating wall located in the housing that separates the housing into a first flow chamber and a second flow chamber that are isolated from one another. A first inlet is located on the housing that connects to the first flow chamber, and a first outlet is located on the housing that connects to the first flow chamber. A second inlet is also located on the housing that connects to the second flow chamber, and a second outlet is located on the housing that connects to the second flow chamber. A first valve body is rotatably positioned in the first flow chamber. The first valve body includes a fluid pathway that connects the first inlet to the first outlet in a first rotational position, prevents flow from the first outlet in a second rotational position, and throttles the flow from the first inlet to the first outlet in an intermediate position. A second valve body is rotatably positioned in a second flow chamber. The second valve body includes a fluid pathway that connects the second inlet and the second outlet in a first rotational position of the second valve body, prevents flow from the second outlet in a second rotational position of the second valve body, and throttles the flow from the second inlet to the second outlet in an intermediate position of the second valve body. At least one actuator controls the positions of the first and second valve bodies.

In one aspect of the invention, an additional inlet is located on the housing and connects to the first flow chamber, and the first valve body is rotatably movable in the first flow chamber to a third rotational position in which the fluid pathway connects the additional inlet and the first outlet, and the first valve body is rotatably movable to a second intermediate position to provide a flow path from the first inlet and the additional inlet which allows the inlet flows to mix in the first chamber and the mixed flow is delivered to the first outlet. This allows controlled mixing of, for example, coolant fluid at different temperatures so that the temperature of the coolant fluid delivered by the first outlet can be at a first temperature.

In another aspect, an additional inlet is also located on the housing and connects to the second flow chamber. The second valve body is rotatably movable in the second chamber to a third rotational position in which the fluid pathway connects the additional inlet of the second flow chamber and the second outlet. The second valve body is also rotatably movable to a second intermediate position to provide a flow path from the second inlet and the additional inlet of the second flow chamber which allows the inlet flows to mix in the second chamber and the mixed flow is delivered to the second outlet. This allows controlled mixing of, for example, coolant fluid at different temperatures so that the temperature of the coolant fluid delivered by the second outlet can be at a second temperature, independently controlled from the first temperature.

In one preferred aspect of the invention, an actuator shaft extends through the housing and is connected through the valve bodies for movement of the valve bodies through the first and second rotational positions as well as the additional rotational positions. In another arrangement, the actuator shaft extends through the housing and is fixed on one of the valve bodies for movement of the one of the valve bodies between the first and second rotational positions as well as the additional rotational positions, and is releasably connected to the other of the valve bodies for independent positioning of the other of the valve bodies between the first and second rotational positions as well as the other positions of the other valve body.

In one arrangement, the housing includes an internal shoulder at a medial position, and the isolating wall is formed as a disk that is seated on the shoulder. Alternatively, the internal wall is formed integrally with the housing. The internal wall can be provided with insulating material in order to further thermally isolate the first and second flow chambers. It is also possible to provide the housing in two separate parts that define the respective flow chambers, and these parts are joined together.

In another aspect, the first and second valve bodies are spheroid bodies, and the inlet and outlet openings in the housing that engage the spheroid bodies have a complementary sealing seat located around the respective inlet and outlet openings that engage the spheroid bodies. In a preferred aspect, the spheroid bodies have hollow centers and act as the fluid pathways within the respective flow chambers.

In one preferred aspect, the first outlet is an axial outlet that is in fluid communication with the hollow center of the first valve body. Those of ordinary skill in the art will recognize from the present disclosure that a plurality of inlets and/or outlets can be provided for one or both of the flow chambers, depending upon the control and mixing desired.

In another aspect of the invention, the actuator shaft extends through an opening in the isolating wall, and a seal is located around this opening. The seal may include a bearing to support the actuator shaft.

In another aspect, the housing includes an end disk on one or both ends, with inwardly extending arms or supports that extend to a respective central support for one of the ends of the actuator shaft. Preferably, seals are provided in the central support for the actuator shaft and may include a bearing feature or separate bearing.

In one preferred embodiment, the housing includes an integral base with a centering feature, and a bearing for the actuator shaft is located in the integral centering feature.

In another aspect, a separate actuator is connected to each of the valve bodies for separate control of the flow through the first and second flow chambers.

In a preferred arrangement, the inlets and the outlets have mounting flanges for connection to the wall of the housing.

In another aspect, the invention provides a thermal management system for a motor vehicle which includes a heat source, as well as a cooling fluid system for transporting fluid from the heat source to a heat exchanger, as well as a thermal management valve module according to the invention. Here, the actuator of the thermal management valve control module is connected to an engine control module for the motor vehicle. The first inlet is connected directly to a fluid pathway from the heat source. The additional inlet of the first flow chamber is connected to a return from the heat exchanger, which provides cooled fluid, with the heat exchanger also including an inlet that is connected to the heat source. The first outlet is connected to a cooling fluid pump. The first valve body is movable so that the fluid directed by the valve module back to the pump for return to the heat source is one of: directly recirculated fluid from the heat source; cooling fluid that has been cooled by the heat exchanger; or a mixture of both the fluid directly from the heat source and the cooled fluid from the heat exchanger, so that fluid at a temperature controlled by the control module is returned via the pump to the heat source.

Preferably, the second inlet is also connected by the cooling fluid system directly to the heat source or an additional heat source, and the additional inlet of the second flow chamber is connected to a return from the heat exchanger that cools the fluid. The second outlet is connected to an additional heat exchanger. The second valve body is movable so that the fluid circulated to the additional heat exchanger via the valve module is one of: directly recirculated fluid from the heat source; cooling fluid that has been cooled by the heat exchanger; or a mixture of both the fluid directly from the heat source and the cooled fluid from the heat exchanger so that fluid at a temperature controlled by the control module is directed to the additional heat exchanger, which can be at a temperature that is different than the temperature of the fluid from the first flow chamber.

This arrangement is particularly useful in connection with internal combustion engines so that heat from the engine block can be directly recirculated via the water pump as the engine comes up to operating temperature in order to allow it to reach an operating temperature more quickly. Thereafter, fluid from the first flow chamber that is set at a desired temperature can be maintained by mixing either the directly recirculated heated fluid from the engine with fluid from the radiator in order to maintain the engine at a desired operating temperature. At the same time, fluid from the second flow chamber can be independently mixed in order to provide fluid from the cooling system at a different temperature to an additional heat exchanger, which can be, for example, a passenger compartment heat exchanger, an oil cooler heat exchanger, a transmission fluid cooler heat exchanger, an EGR cooler, etc.

This system can also be used for an electric vehicle or a hybrid vehicle where the heat source can be the battery pack which also requires cooling, and cooling fluid at different temperatures can be provided for cooling the battery pack and the passenger compartment heat exchanger.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
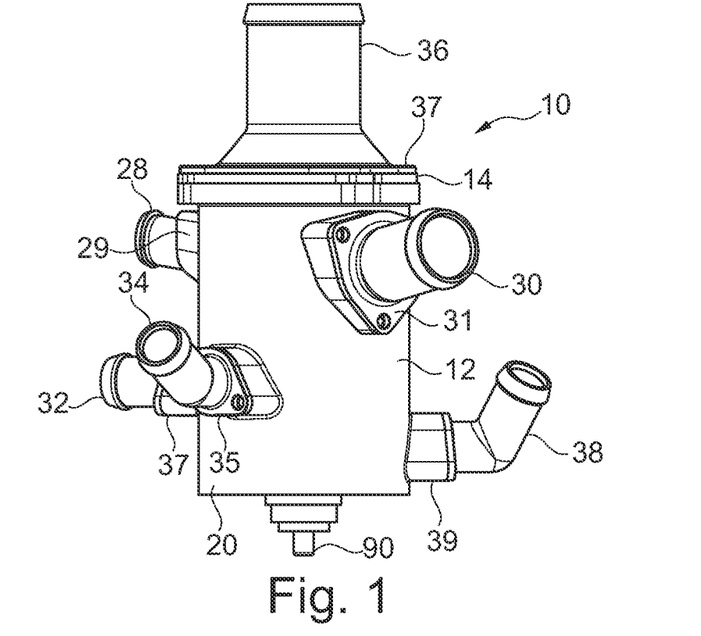
FIG. 1 is an elevational view of a first embodiment of a thermal management valve module according to the invention.
Figure 2:
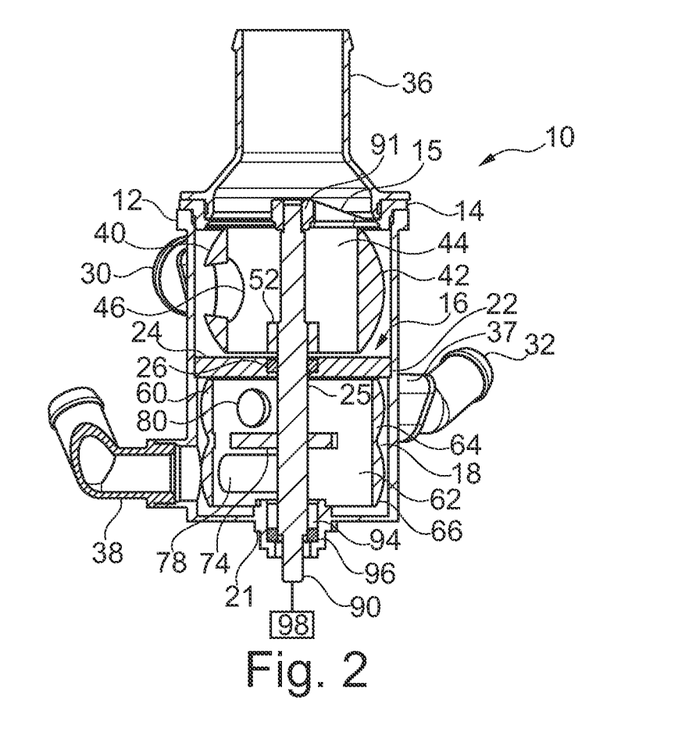
FIG. 2 is a cross-sectional view through the thermal management valve module of FIG. 1.
Figure 3:
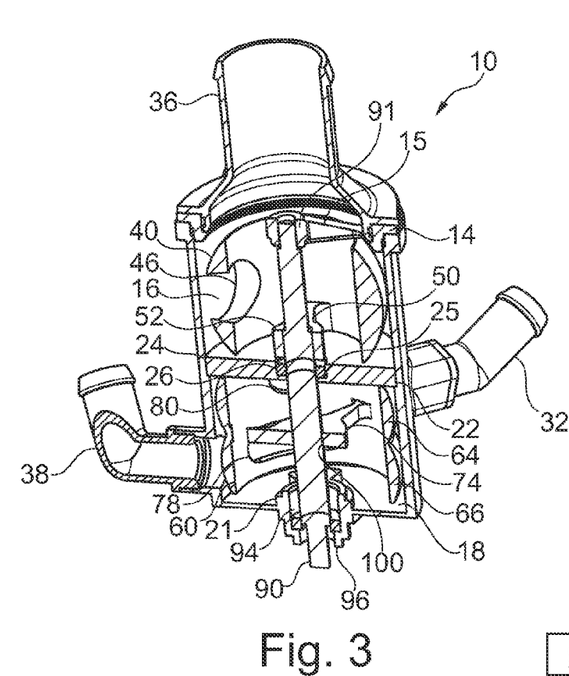
FIG. 3 is a perspective view, partially in cross section, through the thermal management valve module FIGS. 1 and 2.

Referring now to FIGS. 1-3, a first embodiment of a thermal management valve module 10 is shown. As shown in FIG. 1, the valve module 10 includes a valve housing 12 formed with a preferably cylindrical housing wall 20 having a base 21 with a centering feature. An upper end of the valve housing 12 is closed via an end cover 14 having arms 15 which support a center support 91 for an actuator shaft 90 shown in detail in FIGS. 2 and 3, which is discussed in detail below. The housing 12 is divided into a first flow chamber 16 and a second flow chamber 18 by an isolating wall 24. In a preferred embodiment, the isolating wall 24 is a separate disk that is seated on a shoulder 22 formed on an inside of the housing wall 20. This isolating wall 24 can be seated with a seal, if desired. Additionally, it can be formed of an insulating material in order to provide thermal insulation between the first and second flow chambers 16, 18.

As shown in FIGS. 2 and 3, the isolating wall 24 includes an opening 25 through which the actuator shaft 90 extends. A seal 26 can be pressed in the opening 25 in order to provide sealing against the actuator shaft 90. The seal 26 can also act as a bearing for supporting the shaft 90.

As shown in detail in FIG. 1, a plurality of inlets and outlets are connected to the housing 12. A first inlet 28 is located on the housing 12 and connects to the first flow chamber 16. Preferably, the first inlet 28 is connected to the housing 12 via a mounting flange 29. This can be welded, screwed, adhered or otherwise connected to the valve housing 12. An additional inlet 30 (also referred to as a third inlet 30) is preferably located on the valve housing 12 that connects to the first flow chamber 16. This additional inlet 30 is also connected to the valve housing 12 via a mounting flange 31. A first outlet 36 is preferably also located on the valve housing 12 that connects to the first flow chamber 16. This is connected via a flange 37, shown in FIG. 1, which can be placed over the end disk 14 and can be sealed in position via a gasket or sealing material. The mounting flanges 29, 31, 37 can be connected via screws, welding, adhesive, or any other suitable means.

A second inlet 32 is located on the valve housing 12 and connects to the second flow chamber 18. Preferably an additional inlet 34 (also referred to as a fourth inlet 34) is also located on the valve housing 12 and connects to the second flow chamber 18. A second outlet 38 is located on the valve housing 12 and connects to the second flow chamber 18. The second inlet 32, the additional inlet 34, as well as the second outlet 38 are preferably connected via respective mounting flanges 33, 35, 39 to the housing wall 20 of the valve housing 12. The mounting flanges 33, 35, 39 can be connected via screws, welding, adhesive, or any other suitable means.

Referring to FIGS. 2 and 3, a first valve body 40 is rotatably positioned in the first flow chamber 16. The first valve body 40 is preferably a spheroid body having an outer surface 42 defined in cross-section by a curved shape that remains constant as it extends in a peripheral direction about a rotational axis. The inlet and outlet openings in the housing 12 that engage the spheroid body forming the first valve body 40 have a complementary sealing seat located around the respective inlet and outlet openings that engage the spheroid body. The valve body 40 preferably has a hollow center 44. A fluid pathway is defined through the first valve body 40 that connects the first inlet 28 and the first outlet 36 in a first rotational position of the first valve body 40, and that prevents flow from the first outlet 36 in a second rotational position of the first valve body 40. Preferably the first valve body 40 throttles the flow from the first inlet 28 to the first outlet 36 in an intermediate position. The first valve body 40 has a fluid opening 46 is defined through the valve body wall to the hollow center 44. As shown in FIG. 3, preferably at least one support web 50 extends from the outer wall of the valve body 40 to a center shaft connection 52 adapted for support on or connection to the shaft 90. The opening 46 in the valve body 40 can connect one or both of the first and third fluid inlets 28, 30 to the first outlet 36 via the hollow center 44 and the spaces between the arms 15 of the end disk 14. The first valve body 40 is rotatably movable in the first flow chamber to a third rotational position in which the fluid pathway connects the additional inlet 30 and the first outlet 36, as well as to a second intermediate position in which the flow from the first inlet 28 and the additional inlet 30 is mixed in the first flow chamber 16 and delivered to the first outlet. The second intermediate position is controllable by rotatable movement of the first valve body 40 so that the proportion of flow from the first inlet 28 and the additional inlet 30 is controlled so that, for example, a volume of fluid at a first temperature from the first inlet 28 is proportionally adjustable relative to a volume of fluid at a second temperature from the additional inlet 30 so that a desired temperature fluid is delivered to the first outlet 36.

Still with reference to FIGS. 2 and 3, a second valve body 60 is rotatably positioned in the second chamber 18. The second valve body 60 includes a fluid pathway that connects the second inlet 32 and the second outlet 38 in a first rotational position of the second valve body 60. The second valve body 60 is rotatable to a second rotational position that prevents flow from the second outlet 38. Additionally, the second valve body 60 is movable to an intermediate position in which the flow from the second inlet 32 to the second outlet 38 is throttled. Preferably, the second valve body 60 is also formed as a spheroid body and the inlet and outlet openings in the housing 12 that engage the second valve body 60 have a complementary sealing seat located around the respective inlet and outlet openings that engage the spheroid body. As shown in detail in FIGS. 2 and 3, the second valve body 60 includes a first part spheroid outer surface 64 and a second part spheroid surface 66, with the first part spheroid surface 64 being aligned with the opening in the valve housing for the second and fourth inlets 32, 34 and a second part spheroidal surface being aligned with the second outlet 38. The valve body 60 preferably has a hollow center 62 and the wall of the valve body 60 includes an elongated inlet opening 78 as well as an outlet opening 80. A support web 74 preferably extends from the valve body wall to a center area for engagement or support on the actuator shaft 90.

Preferably, the second valve body 60 is rotatably movable in the second chamber 18 to a third rotational position in which the fluid pathway connects the additional inlet 34 of the second flow chamber 18 and the second outlet 38. Additionally, the second valve body 60 is movable to a second intermediate position of the second valve body 60 in which the flow from the second inlet 32 and the additional inlet 34 of the second flow chamber 18 is mixed in the second flow chamber 18 and is delivered to the second outlet 38. This allows a mixture of flows from the second inlet 32 and fourth inlet 34 to be mixed depending upon a rotational position of the second valve body 60 allowing for example, a specific temperature of the fluids being transferred through the thermal management valve module 10 to be controlled in a similar manner as discussed above in connection with the first valve body 40 in the first flow chamber 16.

Due to the isolated arrangement of the first flow chamber 16 and the second flow chamber 18, two different outlet temperatures can be provided from the outlets 36 and 38 of the first and second flow chambers 16, 18.

Those skilled in the art will recognize that a plurality of isolated flow chambers 16, 18, etc. can be provided, if desired. Each of these flow chambers can have a plurality of inlets and/or outlets in order to allow different flow controls.

Figure 4:
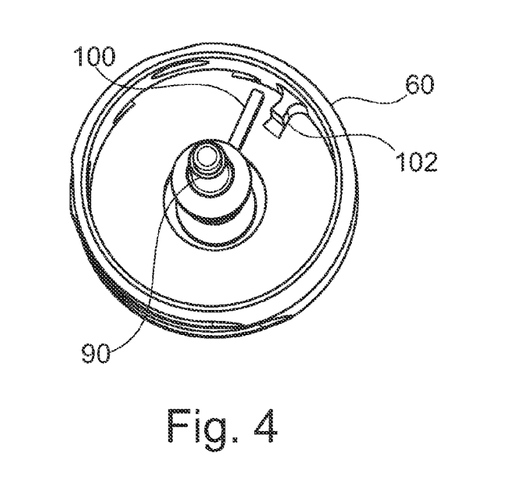
FIG. 4 is a perspective view looking down at the isolating wall separating the first and second flow chambers in the thermal management valve module in FIGS. 1-3.

Still with reference to FIGS. 2 and 3, the actuator shaft 90 extends axially through the valve housing 12 and is supported via an upper support bearing 91, an intermediate support via the bearing/seal 26 in the isolating wall 24, and a lower bearing 94. The lower bearing 94 can also provide a sealing function from the drive for the actuator shaft 90. Separate seals can also be provided, such as the seal 96. A rotary actuator 98 is connected to the actuator shaft 90. Both valve bodies 40, 60 can be directly connected to the shaft 90 which would only allow adjustment of the valve bodies at the same time and the same amounts, limiting the functionality of the thermal management valve module 10. In order to provide independent positioning control of the first and second valve bodies 40, 60, in a first preferred embodiment, the first valve body 40 is fixed to the actuator shaft 90 via the shaft connection 52 on the support web 50. The second valve body 60 is rotatably supported for movement about the actuator shaft 90 via the support web 74. As shown in FIG. 4, an indexing arm 100 is affixed to the actuator shaft 90. An opposing positioning catch 102 is located within the hollow center 62 of the second valve body 60. In this case, rotation of the shaft 90 directly controls the position of the first valve body 40. In order to control a position of the second valve body 60 so that it can be placed in the first rotational position, the second rotational position, the intermediate position, the third rotational position, or the second intermediate position, as well as to throttle or allow proportional flow control from one or both of the inlets 32, 34, the actuator shaft 90 is rotated until the indexing arm 100 contacts the positioning catch 102. The second valve body 60 is then rotated to the desired rotational position in order to achieve the desired flow, mixing, or to block flow from the second outlet 38. The second valve body 60 is preferably held in position by friction with the sealing elements at the inlets 32, 34 and outlet 38, and can be increased or decreased by surface coatings or the surface finish. The actuator shaft 90 can then be rotated in the opposite direction up to about 355° in order to directly position the first valve body 40 in its first rotational position, second rotational position, intermediate position, third rotational position, or second intermediate position as well as to throttle or allow proportional flow control from one or both of the inlets 28, 30 in order to achieve the desired flow through the first flow chamber 16. Through this arrangement where the actuator shaft 90 is releaseably connectable to the second valve body 60, independent positioning of the two valve bodies 40, 60, is possible.

Figure 5:
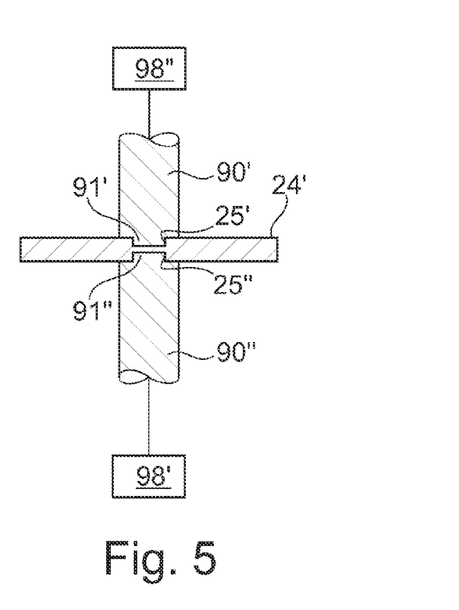
FIG. 5 is an alternate arrangement of the actuating shaft used to control movement of the first and second valve bodies.

Referring now to FIG. 5, an alternate embodiment for actuation of the valve bodies 40 and 60 independently of one another is shown. Here, two separate actuator shafts 90', 90" are provided, each of which is connected to a separate rotary actuator 98', 98". The isolating wall 24' includes pocket bores 25', 25" which receives stub ends 91', 91" of the respective actuator shafts 90', 90". This allows the actuator shafts 90', 90" to be separately actuated with the first valve body 40 being connected directly to the first actuator shaft 90' and the second valve body 60 being directly connected to the second actuator shaft 90" for direct, separate positioning of the valve bodies 40, 60.

Figure 6:
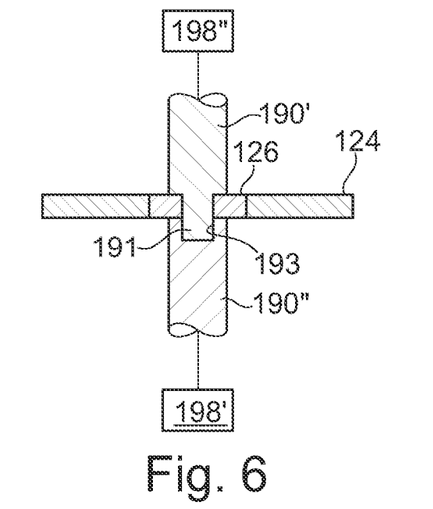
FIG. 6 is a second alternate embodiment of the actuating shafts used to control movement of the first and second valve bodies.

Referring to FIG. 6, a second alternate embodiment for actuation of the valve bodies 40, 60 is shown using two shafts 190', 190". Here, the first shaft 190' includes a pin end 191 which extends through a support seal/bearing 126 located in the isolating wall 124 (which is similar to the isolating wall 24 discussed above). The pin end 191 extends into a pocket bore 193 located in the facing end of the second shaft 190". The first valve body 40 is directly connected to the first shaft 190' and the second valve body 60 is directly connected to the second actuator shaft 190" in order to allow direct rotational positioning. Here, rotatory drives 198', 198" are connected to each of the actuator shafts 190', 190".

Figure 7:
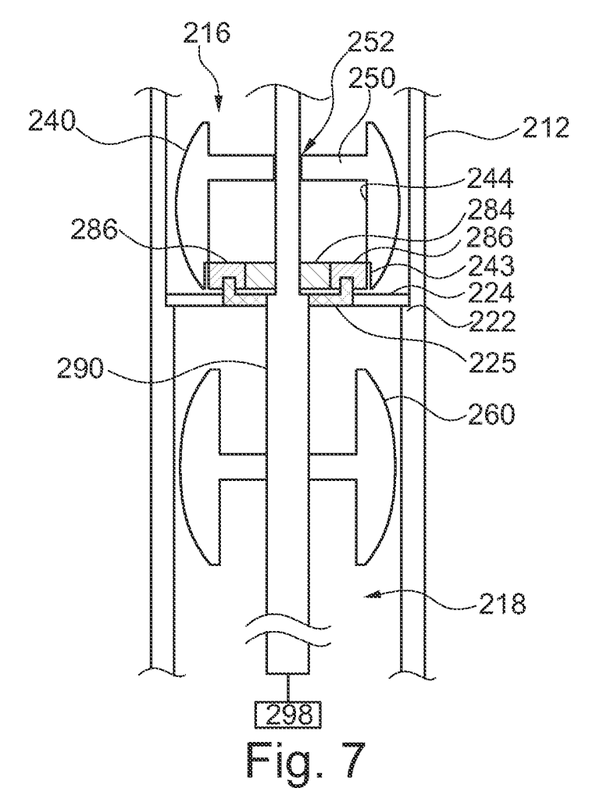
FIG. 7 is a third alternate embodiment of an actuating shaft arrangement for controlling movement of the first and second valve bodies.

Referring to FIG. 7, a third embodiment of an actuator arrangement for separately controlling a position of the first valve body 240 and the second valve body 260 within the valve housing 212 is shown. Here, the arrangement of the valve housing 212 and the inlets and outlets is similar to the arrangement described above in connection with the first embodiment of the valve module 10, and similar elements have been identified with similar element numbers that begin with "200", so that a further detailed description of these similar elements is not necessary. As shown, the second valve body 260 is directly connected to the actuator shaft 290 in order to allow direct positioning of the second valve body 260 in a desired rotational position. The first valve body 240 is preferably mounted to be rotatable about the actuator shaft 290 via a sliding fit opening 252. The inside of the first valve body 240 around a periphery of the hollow inner space 244 includes teeth 243. Planet gears 286, supported on a planet support body 225 having planet axles that extend upwardly, engage the teeth 243. A sun gear 284 is engaged on the actuator shaft 290 and engages the teeth of the planet gears 286. Using this arrangement, a complete rotation of the actuator shaft 290, with a corresponding complete rotation of the second valve body 260, only results in a partial rotation, for example of 45°, of the first valve body 240 due to the reduction gear provided via the sun gear 284 and planet gears 286. Thus, a single rotary actuator 298 connected to the actuator shaft 290 can be used to basically independently adjust a position of the first valve body 240 relative to the second valve body 260.

Those skilled in the art will understand that in each of the above embodiments position sensors may be utilized on the shaft 90, 290 or shafts 90', 90"; 190', 190" in order to accurately determine a position of the valve bodies 40, 60; 240, 260.

Figure 8:
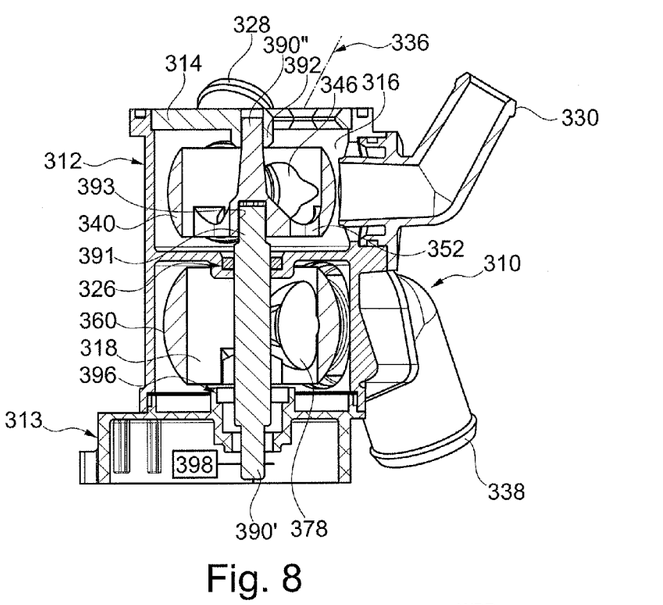
FIG. 8 is a cross-sectional view of a second embodiment of a thermal management valve module according to the invention.

Referring now to FIG. 8, a second embodiment of the thermal management valve module 310 is shown. The second embodiment of the thermal management valve module 310 is similar to the first embodiment 10 described above and similar elements have been identified with similar reference numerals that begin with "300". In the valve module 310, first and second flow chambers 316, 318 are provided. The first inlet 328 and additional inlet 330 (also referred to as the third inlet 330) are connected to the first flow chamber 316 and a second inlet and second additional inlet (not shown) are connected to the second flow chamber 318. The first flow outlet 336 is schematically represented from the axial end of the first flow chamber 316 and the second outlet 338 from the second chamber 318 is shown. Here, the valve housing 312 is formed with an integral isolating wall 324 between the first and second flow chambers 316, 318. The isolating wall 324 includes a recess for a bearing/seal 326. The first valve body 340 includes an integral shaft 390" and includes a receiving bore 393 that receives a pin end 391 of the actuator shaft 390'. The end of the actuator shaft 390" is supported in an integral bearing 392 formed in an upper end disk 314 connected to the valve housing 312 that closes off an upper end of the first flow chamber 316.

The lower end of the valve housing 312 is closed via an actuator housing 313 which holds the rotary actuator 398 as well as the required position sensors for the valve body locations. This arrangement avoids the need for the separate isolating disk 24 provided in the first embodiment and closes the bottom with the actuator housing 313 for the actuator 398 that drives the actuator shaft 390'. In this arrangement, separate actuators could be utilized for the first and second valve bodies 340, 360, or the pin end 391 of the shaft 390' can engage the receiving bore 393 with a positive fitting engagement so that the first valve body 340 is rotated via the actuator shaft 390' and the second valve body 360 can be positioned in a similar manner to the valve body 60 of the first embodiment of the valve module 10 as discussed above.

Figure 9:
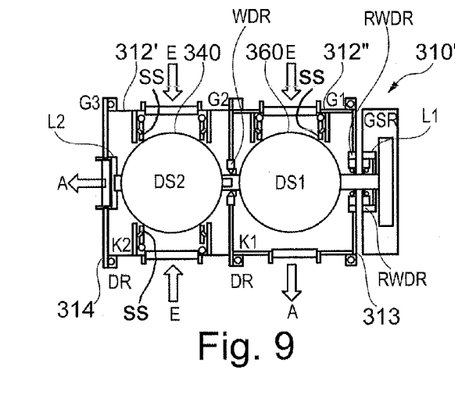
FIG. 9 is a schematic view of the thermal management valve module of FIG. 8 showing a split housing configuration.
Figure 10:
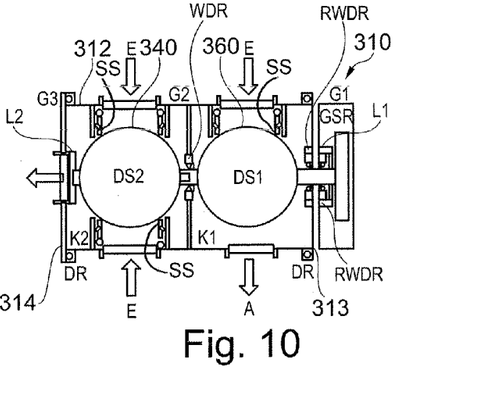
FIG. 10 is a schematic view of the thermal management valve module of FIG. 8 showing a single housing configuration.

Referring to FIGS. 9 and 10, schematic diagrams are shown of the second embodiment of the valve module 310, 310'. The difference here in FIG. 9 versus FIG. 10 is that the thermal management valve module 310' shown in FIG. 9 includes two separate housing parts 312', 312" that are connected together, while the embodiment shown in FIG. 10 includes a single valve housing 312. In both of these schematic diagrams, the valve bodies 340, 360 are indicated along with the inlets indicated as E, the outlets indicated as A, bearings for the shaft, indicated as L1, L2, housing seals indicated as DR, shaft seals indicated as WDR, radial shaft seals indicated as RWDR, and positioning sensors indicated as GSR. Complementary sealing seats located around the respective inlet and outlet openings that engage the spheroid bodies are indicated as SS.

Figure 11:
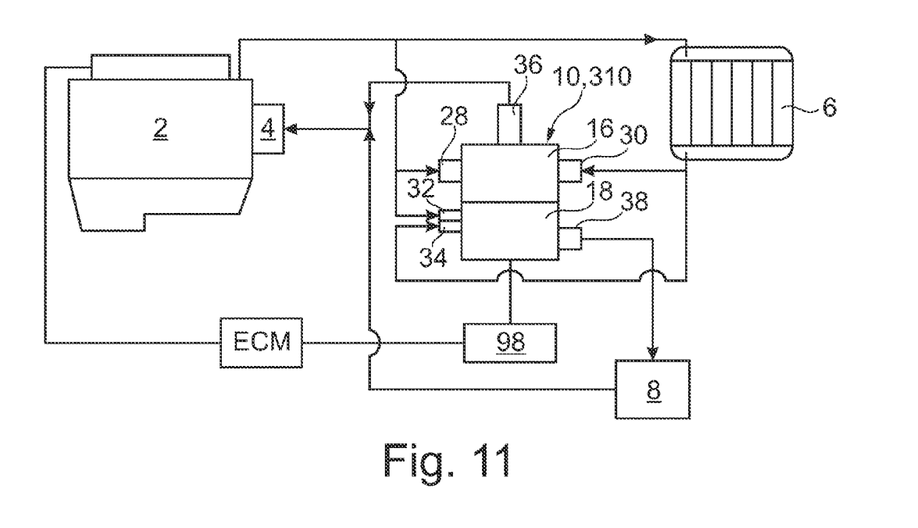
FIG. 11 is a schematic view of a thermal management system for a motor vehicle utilizing the thermal management valve module according to the invention.

Referring now to FIG. 11, a schematic view of a thermal management system for a motor vehicle is shown using the thermal management valve module 10, 310. Here, the internal combustion engine 2 is shown as the heat source and a water pump 4 is shown connected to the internal combustion engine 2. A radiator 6 is shown as the primary heat exchanger, along with a cabin heat exchanger 8 for heating a passenger compartment. Although the cabin heat exchanger is shown, those skilled in the art will recognize that this could be an oil cooler heat exchanger, a transmission fluid heat exchanger, an EGR heat exchanger, etc. In this case, the water pump 4 is connected to a cooling circuit which pushes cooling fluid through the water jackets in the engine block to the radiator 6 or the first inlet 28 of the valve module 10, 310. Fluid can be directed from the radiator 6 to the first flow chamber 16 via the third inlet 30. Depending upon a position of the first valve body, hot fluid from the engine is either recirculated via the first inlet 28 to the first outlet 36 and back to the water pump 4 for recirculation in order to more quickly heat up the engine block, or, upon the engine block reaching a desired temperature, only cooling fluid which has circulated through the radiator 6 to lose heat is circulated via the third inlet 30 to the first flow chamber 16 and back through the outlet 36 to the water pump 4. If it is desired to maintain a precise temperature, the first valve body is adjusted to a position where the flows from the first and third inlets 28, 30 are mixed with desired proportions in the first flow chamber.

The second flow chamber 18 which is isolated from the first flow chamber also includes the second inlet 32 for hot water from the engine block as well as the fourth inlet 34 to receive cooling fluid which has passed through the radiator 6. Depending upon the position of the second valve body, fluid of a desired temperature can then be directed via the second outlet 38 to the passenger compartment heat exchanger 8 prior to being recirculated back to the water pump 4. This arrangement allows for independent control of the outlet temperatures of the cooling fluid through the first and second outlets 30, 38.

Figures 12, 13:
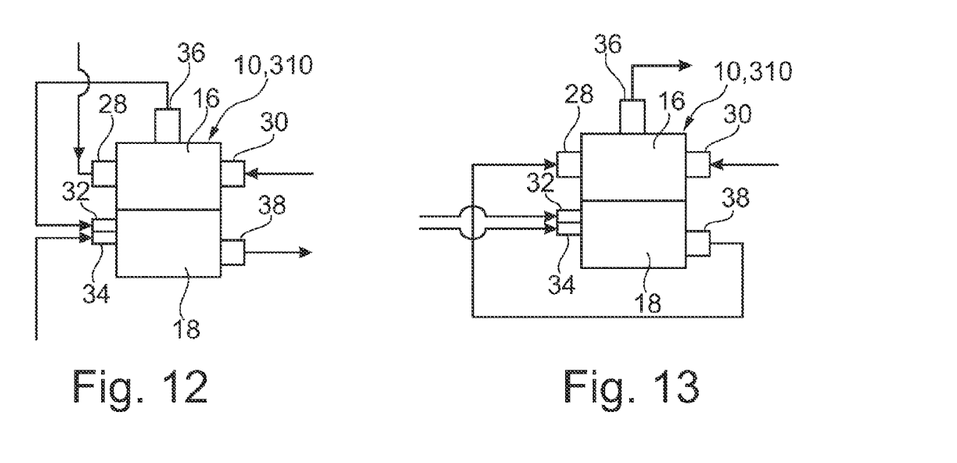
FIG. 12 is a schematic view of an alternate embodiment of a thermal management system using the thermal management valve module of FIG. 1 or FIG. 8 in which the outlet of the first chamber directs fluid to the inlet to the second chamber.
FIG. 13 is a schematic view of a second alternate embodiment of a thermal management system using the thermal management valve module of FIG. 1 or FIG. 8 in which the outlet of the second chamber directs fluid to the inlet to the first chamber.

Referring now to FIGS. 12 and 13, alternate embodiments of a thermal management system using the thermal management valve module 10, 310 are shown. Here, in the alternate embodiment of FIG. 12, the outlet 36 of the first chamber 16 directs fluid to the first inlet 32 of the second chamber 18. This is useful to mix to a certain temperature in the one chamber 16 and then control how this temperature-controlled coolant is distributed to other heat exchangers using a second chamber 18. A second alternative is shown in FIG. 13 where the outlet 38 of the second chamber 18 directs fluid to the first inlet 28 of the first chamber 18, providing the same advantages.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A thermal management valve module, comprising:
    a housing;
    an isolating wall located in the housing that separates the housing into a first flow chamber and a second flow chamber that are isolated from one another;
    a first inlet on the housing that connects to the first flow chamber;
    a first outlet on the housing that connects to the first flow chamber;
    a second inlet on the housing that connects to the second flow chamber;
    a second outlet on the housing that connects to the second flow chamber;
    a first valve body rotatably positioned in the first flow chamber, the first valve body including a fluid pathway that, in a first rotational position, connects the first inlet and the first outlet, and in a second rotational position, prevents flow from the first outlet, and in an intermediate position, throttles the flow from the first inlet to the first outlet;
    a second valve body rotatably positioned in the second flow chamber, the second valve body including a fluid pathway that in a first rotational position of the second valve body connects the second inlet and the second outlet, and in a second rotational position of the second valve body, prevents flow from the second outlet, and in an intermediate position of the second valve body throttles the flow from the second inlet to the second outlet; and a single actuator that controls the positions of the first and second valve bodies, with the first valve body being movable by a first rotational distance between the first and the second rotational positions of the first valve body while the second valve body remains in one of the first or second rotational positions of the second valve body or rotates a second rotational distance that is less than the first rotational distance.

2. The thermal management valve module of claim 1, wherein an additional inlet is located on the housing that connects to the first flow chamber, and the first valve body is rotatably moveable in the first flow chamber to a third rotational position in which the fluid pathway connects the additional inlet and the first outlet, and the first valve body is rotatably movable to a second intermediate position to provide a flow path from the first inlet and the additional inlet which allows the inlet flows to mix in the first chamber and the mixed flow is delivered to the first outlet.

3. The thermal management valve module of claim 2, wherein an additional inlet is located on the housing that connects to the second flow chamber, and the second valve body is rotatably movable in the second chamber to a third rotational position in which the fluid pathway connects the additional inlet of the second flow chamber and the second outlet, and the second valve body is rotatably movable to a second intermediate position to provide a flow path from the second inlet and the additional inlet of the second flow chamber which allows the inlet flows to mix in the second chamber and the mixed flow is delivered to the second outlet.

4. The thermal management valve module of claim 1, wherein the housing includes an internal shoulder at a medial position and the isolating wall comprises a disk that is seated on the shoulder.

5. The thermal management valve module of claim 1, wherein the first and second valve bodies are spheroid bodies and the inlet and outlet openings in the housing that engage the spheroid bodies have a complementary sealing seat located around the respective inlet and outlet openings that engage the spheroid bodies.

6. The thermal management valve module of claim 5, wherein the spheroid bodies have hollow centers.

7. The thermal management valve module of claim 6, wherein the first outlet is an axial outlet that is in fluid communication with the hollow center of the first valve body.

8. The thermal management valve module of claim 1, wherein a plurality of inlets or outlets can be provided for one or both of the flow chambers.

9. The thermal management valve module of claim 1, wherein the isolating disk has a thermal insulating property.

10. The thermal management valve module of claim 1, wherein an actuator shaft extends through the housing and is connected to the valve bodies for positioning of the valve bodies between the first and second rotational positions.

11. The thermal management valve module of claim 1, wherein the single actuator includes an actuator shaft that extends through the housing and is fixed to one of the valve bodies for positioning of the one of the valve bodies between the first and second rotational positions, and is releasably connectable to the other of the valve bodies for independent positioning of the other of the valve bodies between the first and second rotational position of the other of the valve bodies.

12. The thermal management valve module of claim 11, wherein the actuator shaft extends through an opening in the isolating wall, and a seal is located around the opening.

13. The thermal management valve module of claim 12, wherein the seal includes a bearing to support the actuator shaft.

14. The thermal management valve module of claim 12, wherein the housing further includes an end disk with inwardly extending arms or supports that end in a central support for one end of the actuator shaft.

15. The thermal management valve module of claim 12, wherein the housing includes a base with a centering feature with a bearing for the actuator shaft.

16. The thermal management valve module of claim 12, wherein a seal is located in a base of the housing for the actuator shaft.

17. The thermal management valve module of claim 1, wherein the inlets and the outlets have mounting flanges for connection to a wall of the housing.

18. A thermal management valve module, comprising:
a housing;
an isolating wall located in the housing that separates the housing into a first flow chamber and a second flow chamber that are isolated from one another;
a first inlet on the housing that connects to the first flow chamber;
a first outlet on the housing that connects to the first flow chamber;
a second inlet on the housing that connects to the second flow chamber;
a second outlet on the housing that connects to the second flow chamber;
a first valve body rotatably positioned in the first flow chamber, the first valve body including a fluid pathway that, in a first rotational position, connects the first inlet and the first outlet, and in a second rotational position, prevents flow from the first outlet, and in an intermediate position, throttles the flow from the first inlet to the first outlet;
a second valve body rotatably positioned in the second flow chamber, the second valve body including a fluid pathway that in a first rotational position of the second valve body connects the second inlet and the second outlet, and in a second rotational position of the second valve body, prevents flow from the second outlet, and in an intermediate position of the second valve body throttles the flow from the second inlet to the second outlet; and a separate actuator is connected to each of the valve bodies that separately position the first and second valve bodies.

* * * * *